United States Patent

[11] 3,624,116

| [72] | Inventor | Laird Gordon Lindsay Ward<br>Suffern, N.Y. |
|---|---|---|
| [21] | Appl. No. | 873,653 |
| [22] | Filed | Nov. 3, 1969 |
| [45] | Patented | Nov. 30, 1971 |
| [73] | Assignee | The International Nickel Company, Inc.<br>New York, N.Y. |

[54] NICKEL DERIVATIVES OF METHYLENE BIS-SALICYLIC ACID AND PROCESS FOR PREPARING THE SAME
9 Claims, No Drawings

[52] U.S. Cl. .................................................. 260/439 R,
252/400, 252/404, 260/45.75 N
[51] Int. Cl. ...................................................... C07f 15/04
[50] Field of Search ........................................... 260/439,
45.75 M, 429; 252/39.9, 404

[56] References Cited
UNITED STATES PATENTS

| 3,035,091 | 5/1962 | Wygant ..................... | 260/520 |
|---|---|---|---|
| 3,052,515 | 9/1962 | Donaruma .................. | 23/14.5 |
| 3,196,128 | 7/1965 | Tazewell et al. ............. | 260/45.75 |

Primary Examiner—Tobias E. Levow
Assistant Examiner—A. P. Demers
Attorney—Maurice L. Pinel

ABSTRACT: Nickel derivatives of methylene bis-salicylic acid are prepared in which methylene bis-salicylic acid, a Group Ia metal alkoxide and a nickel salt are reacted in an essentially nonaqueous environment, and the nickel derivatives are precipitated from solution. Nickel methylene bis-salicylate is effective as a light stabilizing additive in polymers such as polyvinylchloride.

NICKEL DERIVATIVES OF METHYLENE BIS-SALICYLIC ACID AND PROCESS FOR PREPARING THE SAME

This invention relates to novel nickel derivatives of methylene bis-salicyclic acid, to a process of preparing the same, and to polymer systems characterized by improved stability against deterioration due to weathering effects by virtue of incorporating such additives therein.

Nearly all plastics are degraded by extended exposure to outdoor weathering. Much of the weathering which occurs is directly attributable to exposure to light, and particularly, to the ultraviolet component thereof. Polyvinylchloride (PVC), an important vinyl polymer, is particularly light-sensitive and suffers extensive degradation including both discoloration and embrittlement upon exposure to light. Many attempts have been made to stabilize these polymers by introducing various additives, and some improvement in their stability upon exposure to light has been effected in a number of cases. However, more effective and more economical stabilizers are needed.

It has now been discovered that novel nickel derivatives of methylene bis-salicylic acid prepared by the process of the invention are useful as light stabilizers for polymer systems. Moreover, a novel process has been found for producing such compounds in which methylene bis-salicylic acid, a Group Ia metal alkoxide and a nickel halide are reacted to precipitate the nickel derivatives.

It is an object of the invention to provide a vinyl polymer system having improved stabilization characteristics against degradation by light.

Another object of this invention is to provide a process for making the nickel derivatives of methylene bis-salicylic acid.

Other objects and disadvantages will become apparent from the following description.

Generally speaking, the present invention contemplates a process for making the nickel derivatives of methylene bis-salicylic acid involving a sequence of reactions which are conducted under anhydrous conditions. The nickel derivatives provided in accordance with the invention are useful as light stabilizing additives for polymers, particularly the vinyl polymers such as polyvinylchloride and polyvinyl acetate, but may also improve the light stability of polyolefins such as polyethylene and polypropylene.

More particularly, the nickel derivatives of methylene bis-salicylic acid are prepared by reacting methylene bis-salicylic acid; a Group Ia metal alkoxide which beneficially is the reaction product of a Group Ia metal, e.g., lithium, sodium or potassium, and an alcohol having from one to four carbon atoms, e.g., methanol, ethanol, propanol, isopropanol, n-butanol, isobutanol or sec-butanol; and an anhydrous, or substantially nonaqueous solvent, particularly one selected from the group consisting of methanol, ethanol propanol, isopropanol, n-butanol, isobutanol, sec-butanol, acetone, tetrahydrofuran, dimethoxyethane and dimethylformamide; and precipitating the nickel derivative.

The methylene bis-salicylic acid (MBS) employed in the process and referred to hereinafter is that which is commercially available, i.e., a technical grade tan colored powder which melts in the range 228° C. to 240° C. and is a mixture of about 55 percent to 60 percent of the 5,5'-isomer having the structure, (I) 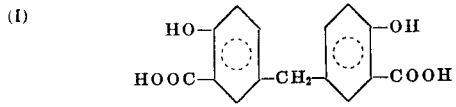

the balance being essentially low molecular weight polymers of the general formula, (II) 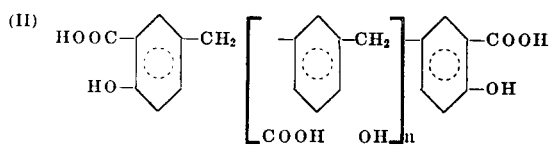

where n is an integer no greater than 10. It will be understood that methylene bis-salicylic acid composed entirely of structure (I) above is also quite suitable as a reactant in the process.

The sequence in which the reactions of the invention are conducted is of significant importance. Thus, the methylene bis-salicylic acid is first reacted with the Group Ia metal alkoxide in such amount as to form Group Ia metal derivatives of methylene bis-salicylic acid. In this reaction, it is essentially the ionizable hydrogen of the carboxylic acid groups of MBS which is available for the reaction. Sufficient Group Ia metal alkoxide is provided to react with substantially all of the ionizable hydrogen. Thereafter, sufficient nickel is made available in the form of a nickel halide to react with and replace substantially all the Group Ia metal. The product of this reaction is a nickel compound having the general formula,

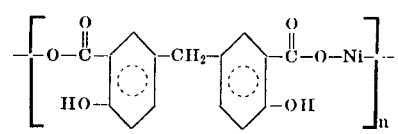

where n is an integer having a value of at least 2 but no more than 10, in admixture with nickel derivatives of the polymers described in (II) above. A direct reaction between the nickel dihalide and MBS does not readily occur.

In selecting the Group Ia metal for the reaction, it must be noted that rubidium and cesium are highly reactive Group Ia metals, and for that reason are less desirable for the contemplated reaction to produce an alkoxide. Also, rubidium chloride is not very soluble in alcohol and cesium chloride is quite hygroscopic; these properties being disadvantageous in the reactions of the invention. While the anhydrous nickel halide can be used in its pure form as a reactant to the extent that it is soluble in the nonaqueous solvent, it is advantageous to provide the nickel halide in the more soluble form of anhydrous organic complex. Such a soluble organic complex may be prepared by reacting the hydrated nickel halide (chloride, bromide or iodide) with peroxide-free, ethyleneglycol dimethylether EGDE The product of this reaction is nickel halide dimethoxyethanate (nickel halide ·EGDE complex). The nickel halide ·EGDE complex is quite soluble in alcohol and it is also soluble in acetone, tetrahydrofuran, dimehtoxyethane and dimethylformamide.

The alcohols employed in the process, which desirably contain from one to four carbon atoms, may function as solvents as well as reactants, i.e., the stoichiometric amount of alcohol functioning as a reactant while the excess alcohol functions as a solvent. Alcohols having more than four carbon atoms are less reactive at the reaction temperatures characterizing this process and for that reason, are not as well suited for use as solvents, although they will react with the alkali metal. Alcohols having up to 12 carbon atoms may be used as reactants, but the higher alcohols, e.g., isoamyl alcohol, may react more slowly, and the system may have to be heated to obtain the reaction. Under normal conditions, the tertiary butyl alcohol does not react with lithium or sodium.

In order to obtain the desired nickel derivatives of methylene bis-salicylic acid from solution, it will be understood that the byproduct of the reaction, i.e., the alkali metal halide, must be soluble in the solvent employed to facilitate separation of the product from the byproduct. Since alcohols are advantageous solvents, it will be apparent that reactants which result in the production of byproducts which are relatively insoluble, or only slightly soluble, in alcohols, such as lithium fluoride, sodium fluoride, sodium chloride, sodium bromide, potassium fluoride, potassium chloride, potassium bromide, rubidium fluoride, rubidium bromide and cesium fluoride, are not entirely suitable for the practice of this process, if an alcolhol is used as solvent.

It is possible, though less convenient, to use other solvents in the process (with alcohol functioning only as a reactant), including acetone, tetrahydrofuran, dimethoxyethane and dimethylformamide. The nickel halide EGDE complex and the byproduct alkali metal halides such as lithium chloride, lithium bromide, lithium iodide, sodium iodide, potassium iodide, rubidium iodide, cesium chloride, cesium bromide and cesium iodide, will dissolve in these solvents.

The desired reactions do not occur when attempted in aqueous solution. Accordingly, care must be taken to assure that the reactions are carried out under nonaqueous conditions.

After the reactions are carried out under nonaqueous conditions.

After the reaction, the resultant fluid mixture is concentrated by evaporation of methanol, and then cooled to precipitate the crystalline product which can then be separated from the remaining fluid by filtration. The crystalline material obtained is then rinsed in anhydrous alcohol to remove impurities and alcohol-soluble byproducts, and dried under anhydrous conditions, e.g., dry nitrogen, to avoid possible contamination with water. Drying may also be accomplished under vacuum, but in that case the temperature should be no higher than about 26° C. to minimize loss of the methanol of crystallization.

The use of the nickel methylene bis-salicylates as a light stabilizer for polymers, such as polyvinylchloride, calls for mixing the nickel compounds with the polymer, for example, in a proportion of up to 10 parts by weight of compound, e.g., 1 part by weight of compound per 100 parts by weight of the polymer, and with other necessary ingredients, at a temperature from about 75° F. to 285° F., until the powder mixture is well blended and then, after cooling, extruding the powder mixture or otherwise processing it to final form.

Ordinarily, a minimum of at least about 0.25 part by weight of compound per hundred parts by weight of polymer is required to effect a substantial degree of stabilization. A highly satisfactory addition is about one part by weight of compound per one hundred parts by weight of polymer. The treated polymer is characterized by a substantial ability to resist degradation upon exposure to natural or strong artificial light for an extended period.

In order to give those skilled in the art a better understanding of the invention, particularly the preparation of compounds in accordance with the invention, the following illustrative example is given:

EXAMPLE

Preparation of illustrative Nickel Chloride Dimethoxyethanate (Nickel Chloride EGDE complex)

One liter of a peroxide-free ethylene-glycol dimethylether, 331 grams (2.0 moles) of pulverized nickel chloride dihydrate and 651 grams (4.4 moles) of triethyl orthoformate as a dehydrating agent were vigorously stirred at reflux temperature under nitrogen for about 2 hours in a three-necked 3-liter flask fitted with a reflux condenser and a mechanical stirrer. At this stage, a Karl Fischer titration of the supernatant green liquid showed it to contain less than 0.04 milligram of $H_2O$ per milliliter solvent. The completed reaction slurry was cooled and the orange granular solids were collected under nitrogen, rinsed successively with anhydrous EGDE, then pentane, and dried in a nitrogen atmosphere at 26° C. and a pressure of 20 cm. Hg. The yield was nearly quantitative (about 430 grams). The calculated analysis for $C_4H_{10}Cl_2O_2Ni$, the empirical formula for nickel chloride dimethoxyethanate, was as follows: 21.8 percent carbon; 4.59 percent hydrogen; 32.27 percent chlorine; 26.72 percent nickel; balance oxygen. The observed analysis was: 21.59 percent carbon; 4.72 percent hydrogen; 31.98 percent chlorine; 26.54 percent nickel; balance oxygen (by difference).

Preparation of the Lithium Salt of Methylene Bis-salicylic acid

A solution (1.5 liters) of lithium methoxide in methanol was first prepared from 3.5 grams (0.5 gram-atom) of lithium and methanol. To this solution was added a methanol solution (300 milliliters) of commercial methylene bis-salicylic acid (50 grams, 0.174 mole, molecular weight assumed—288). The temperature of the solution did not exceed 40° C. in the reaction which took place and the resulting red solution was concentrated to 250 milliliters. This was diluted with 500 milliliters anhydrous peroxide-free tetrahydrofuran and the resulting white precipitate (55 grams) of the polylithium salt of methylene bis-salicylic acid was collected, washed with anhydrous tetrahydrofuran and dried in nitrogen at 23° C. and 2 cm. Hg.

Preparation of Nickel Methylene Bis-Salicylate (Compound 1)

The nickel derivative was prepared from the isolated lithium salt of methylene bis-salicylic acid (MBS) in a reaction in which the MBS, $Li^+$ and $Ni^{++}$ were present in the proportions of 1:3:2.2. Nickel chloride EGDE complex (anhydrous, 82.5 grams, 0.376 mole) in anhydrous methanol (200 milliliter) was added to a vigorously stirred anhydrous methanol solution (500 milliliter) of lithium methylene bis-salicylate (55 grams). The resultant green slurry was heated at reflux temperature for 1 hour then cooled. The precipitate (k99 grams) was collected at 23° C., washed twice with methanol (200 milliliters each time) to remove lithium chloride, then dried in nitrogen at 23° C. at a pressure of 2 cm. Hg. The precipitate which contained 14.18 percent nickel on further drying at 110° C. for one minute in vacuum lost about 30 percent of a volatile component (methanol), which corresponds to the loss of about six methanol molecules of crystallization, and the residue contained 23.25 percent nickel.

The above prepared methanol solvated-nickel methylene bis-salicylate was insoluble in hexane, dichloromethane, nitromethane, chloroform, carbon tetrachloride, acetonitrile, tetrahydrofuran, trichlorethylene, ether and acetone. It was very slightly soluble in methanol and in dimethyl sulfoxide upon prolonged boiling in these solvents. The lithium chloride byproduct has adequate solubility in methanol to permit relatively complete removal of this salt in the dissolved state.

Nickel methylene bis-salicylate may also be prepared from EGDE-complexed nickel bromide. In this case, the byproduct lithium bromide, has a high solubility in the methanol solvent reaction medium, and thus contamination with lithium salts is minimized. Further, an anhydrous solution of nickel halide in a mixture of ethyl formate and ethyl alcohol is also satisfactory for the preparation of nickel methylene bis-salicylate. Such a nickel chloride complex is prepared by reacting hydrated nickel halide with triethyl orthoformate. A reaction of the following type is believed to take place:

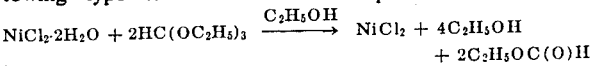

$$NiCl_2 \cdot 2H_2O + 2HC(OC_2H_5)_3 \xrightarrow{C_2H_5OH} NiCl_2 + 4C_2H_5OH + 2C_2H_5OC(O)H$$

The nickel halide solution thus obtained may then be reacted with a Group Ia metal salt of MBS as described above to produce the desired end product.

The nickel methylene bis-salicylate (Compound 1), prepared as described above, was evaluated as a light stabilizer by incorporation in polyvinylchloride (PVC) film samples.

In preparing the polyvinylchloride film, one part by weight of the methanol solvated-nickel methylene bis-salicylate was added to one hundred parts by weight of PVC powder in the dry-mixing head of a Barbender Plastograph, a sigma blade mixer. The mixture was heated to about 230° F. At this point, 50 parts of dioctyl phthalate, a plasticizer, were added. Heating continued to about 260° F. and 2 parts of a glyceride lubricant (Glycolube RP) were added. The batch was further dry blended for 10 minutes at 260° F. to 280° F. and then cooled. The blended powder was then transferred to an extruder hopper and fed into the extruder screw. The extrusion was carried out at a temperature of about 330° F. and a 2-inch wide by 0.01-inch thick film was extruded. The film was cut into about 9-½inch lengths which were clamped in suitable holders under slight tension with about 8½ inches exposed for weathering. Film holders were provided with PVC film samples incorporating the stabilizing nickel compound of the invention as well as with uninhibited PVC film samples (blanks). The PVC film samples were exposed to accelerated weathering conditions including simulated sunshine (carbon arc illumination) and rain (water-spray) in a suitable testing device (Sunshine Carbon Arc Weather-Ometer). The cycle time on accelerated weathering was 102 minutes of simulated sunshine followed by 18 minutes of simulated sunshine and rain. The results obtained are set forth in the following table.

TABLE

| Film samples | Hours to Failure | Type of Failure |
|---|---|---|
| Blank A | 230 | Brittle, Black |
| Blank B | 234 | Brittle, Black |
| Blank C | 270 | Brittle, Black |
| Compound I | 800 | Brittle, Discolored |

It is seen that the uninhibited samples (blanks) exposed failed consistently at well less than 300 hours. In marked contrast the methanolated nickel methylene bis-salicylate clearly stabilized the polyvinylchloride against degradation upon exposure to light for a substantially greater period, time to failure being more than 2 to 2½times that of the uninhibited samples. Similar results are obtained using nickel methylene bis-salicylate, without associated methanol since, in any case, the methanol is driven off during the heat mixing process.

An efficient and relatively simple process has thus been presented for the preparation of nickel methylene bis-salicylate and the usefulness of this nickel compound has been demonstrated as a light stabilizing additive for polymers.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims. For example, while reactions in accordance with the invention have been described in which sufficient Group Ia metal alkoxide is introduced to react with substantially all of the ionizable hydrogen and in which sufficient anhydrous nickel halide is employed to react with and replace substantially all of the Group Ia metal, it will be understood that either or both reactions may also be carried out with less than the stoichiometric amount of Group Ia metal alkoxide or anhydrous nickel halide, respectively. The products of such reactions are nickel derivatives containing less than the maximum amount of nickel or mixed lithium and nickel derivatives of MBS. Such nickel derivatives will also improve the light stability of polymers.

I claim:

1. A process for preparing a nickel derivative of methylene bis-salicylic acid which comprises the steps of
    a. reacting methylene bis-salicylic acid in an essentially nonaqueous solvent selected from the group consisting of methanol, ethanol, propanol, isopropanol, n-butanol, isobutanol, sec-butanol, acetone, tetrahydrofuran, dimethoxyethane and dimethylformamide with a Group Ia metal alkoxide which is a reaction product of a Group Ia metal selected from the group consisting of lithium, sodium and potassium an an alcohol selected from the group consisting of methanol, ethanol propanol, isopropanol, n-butanol, isobutanol and sec-butanol;
    b. reacting an essentially anhydrous nickel halide with the reaction product of step (a); and
    c. precipitating the resulting nickel derivative of the methylene bis-salicylic acid.
2. The process of claim 1 wherein the essentially anhydrous nickel halide is selected from the group consisting of a nickel halide dimethoxy-ethanate complex and an anhydrous solution of nickel halide in a mixture of ethyl formate and ethyl alcohol.
3. The process of claim 1 wherein the solvent is methanol.
4. The process of claim 1 wherein the Group Ia metal alkoxide reactant is the reaction product of lithium and methanol.
5. The process of claim 4 wherein the solvent is methanol.
6. The process of claim 1 wherein the Group Ia metal alkoxide reactant is lithium methoxide and the anhydrous nickel halide is a nickel halide dimethoxy-ethanate complex.
7. A process for preparing a nickel derivative of methylene bis-salicylic acid which comprises the steps of
    a. reacting methylene bis-salicylic acid in an essentially nonaqueous solvent selected from the group consisting of methanol, ethanol, propanol, isopropanol, n-butanol, isobutanol, sec-butanol, acetone, tetrahydrofuran, dimethoxyethane and dimethylformamide with lithium methoxide;
    b. reacting a nickel chloride dimethoxy-ethanate complex with the reaction product of step (a); and
    c. precipitating the resulting nickel derivative of the methylene bis-salicylic acid.
8. A process of preparing nickel methylene bis-salicylate under anhydrous conditions which comprises first reacting in methanol, methylene bis-salicylic acid and methanolic lithium methoxide, then introducing as a reactant nickel chloride dimethoxyethanate and thereafter precipitating nickel methylene bis-salicylate.
9. A light stabilizing additive composed of a nickel compound having the formula

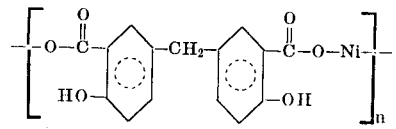

where $n$ is an integer having a value of at least 2 but no more than 10 in admixture with a nickel derivative of a polymer having the general formula,

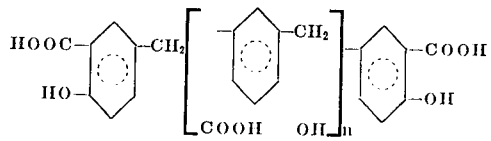

where $n$ is an integer no greater than 10.

* * * * *